United States Patent [19]

Ishizuka et al.

[11] 3,926,078
[45] Dec. 16, 1975

[54] NUMERICAL CONTROL LATHE OF SLIDING-HEADSTOCK TYPE

[75] Inventors: Shinichi Ishizuka, Tokyo; Kuniyuki Mihara, Tachikawa, both of Japan

[73] Assignee: Citizen Watch Co., Ltd., Tokyo, Japan

[22] Filed: Jan. 10, 1975

[21] Appl. No.: 539,995

Related U.S. Application Data

[63] Continuation of Ser. No. 367,389, June 6, 1973, abandoned.

[30] Foreign Application Priority Data

| June 10, 1972 | Japan | 47-57819 |
| June 14, 1972 | Japan | 47-59139 |
| Oct. 17, 1972 | Japan | 47-103863 |
| Apr. 20, 1973 | Japan | 48-4496 |

[52] U.S. Cl. ................................. 82/2.5
[51] Int. Cl.² ............................. B23B 13/00
[58] Field of Search ....................... 82/2.5

[56] References Cited
UNITED STATES PATENTS

| 2,374,112 | 4/1945 | Lloyd | 82/2.5 |
| 2,377,383 | 6/1945 | Slovak | 82/2.5 |
| 3,101,019 | 8/1963 | Lelan | 82/2.5 |
| 3,200,680 | 8/1965 | Coffin | 82/2.5 |
| 3,550,487 | 12/1970 | Randall et al. | 82/2.5 |
| 3,550,503 | 12/1970 | Pallay | 82/2.5 X |
| 3,557,971 | 1/1971 | Tomlyama | 82/2.5 |
| 3,636,802 | 1/1972 | Hessinger | 82/2.5 |
| 3,736,819 | 6/1973 | Gibbon et al. | 82/2.5 |

*Primary Examiner*—Harrison L. Hinson
*Attorney, Agent, or Firm*—Ernest G. Montague; Karl F. Ross; Herbert Dubno

[57] ABSTRACT

A numerical control lathe of the sliding-headstock type comprises an elongated bed, a headstock reciprocatingly disposed on said bed to travel longitudinally of said bed, a driving spindle rotatably supported on said headstock and having a collet chuck for supporting a workpiece on the spindle, a guide bush situated coaxially to the axis of the spindle so as to rotatably support the workpiece, a pedestal for supporting said guide bush detachably attached to said bed, a turret toolpost having a slide block movable in a direction perpendicular to the axis of the spindle, and another turret toolpost having a slide block movable in a direction parallel to the axis of the spindle.

5 Claims, 11 Drawing Figures

NUMERICAL CONTROL LATHE OF SLIDING-HEADSTOCK TYPE

This is a continuation of application Serial No. 367,389 filed 6 June 1973, now abandoned.

The present invention relates to a numerical control lathe of the sliding-headstock type for imparting prescribed shape to a workpiece.

The prior automatic lathe of the sliding-headstock type includes a structual defect in that a spindle is rotatably supported on a headstock by bearings far from the spindle head because the spindle must extend through an aperture formed in a tool stock upon removing a guide bush for rotatably supporting a bar-shaped workpiece when a workpiece having no rounded cross-section is cut. Accordingly, because of the limitation of spindle diameter within the aperture, the spindle can not be maintained with a sufficient rigidity to prevent the workpiece from being heavily cut.

Furthermore, the prior lathe can not be used for chucking a workpiece having a diameter larger than that of the aperture of the tool stock, because the pedestal for supporting the guide bush is integrally formed with the tool stock.

An object of this invention is to provide an automatic lathe involving a numerical control system obviating the above-mentioned defects and suitable for use in cutting various workpieces.

Another object of this invention is to provide an improved automatic lathe capable of machining a workpiece into one of several shapes such as a bar shape with a small diameter and long length, a block shape with a large diameter and short length and the like, in such a manner that chips are conveniently removed from a cutting region without impeding the cutting operation.

A third object of this invention is to provide an automatic lathe, which comprises a turret toolpost having a slide movable in a direction parallel to the axis of a spindle supported in a headstock. The improved lathe is characterized by including a device for progressively adjusting the spacing of tools from the spindle with ease, so as to exactly guide the respective ends of the tools to a cutting position defined near a guide bush for rotatably supporting a workpiece, even where the tools have different lengths.

A fourth object of this invention is to provide an automatic lathe, which comprises a loose headstock or tail stock with a center aligned with a spindle supported on a main sliding headstock. The improved lathe includes a device for carrying the tail stock synchronously with the travel of the main headstock, so that a workpiece can be cut under conditions relieved of the compression load, by means of a tool attached to a vertical travelling tool post.

The other features and advantages of this invention will be understood from the following description with reference to the accompanying drawing in which.

Figure 1:
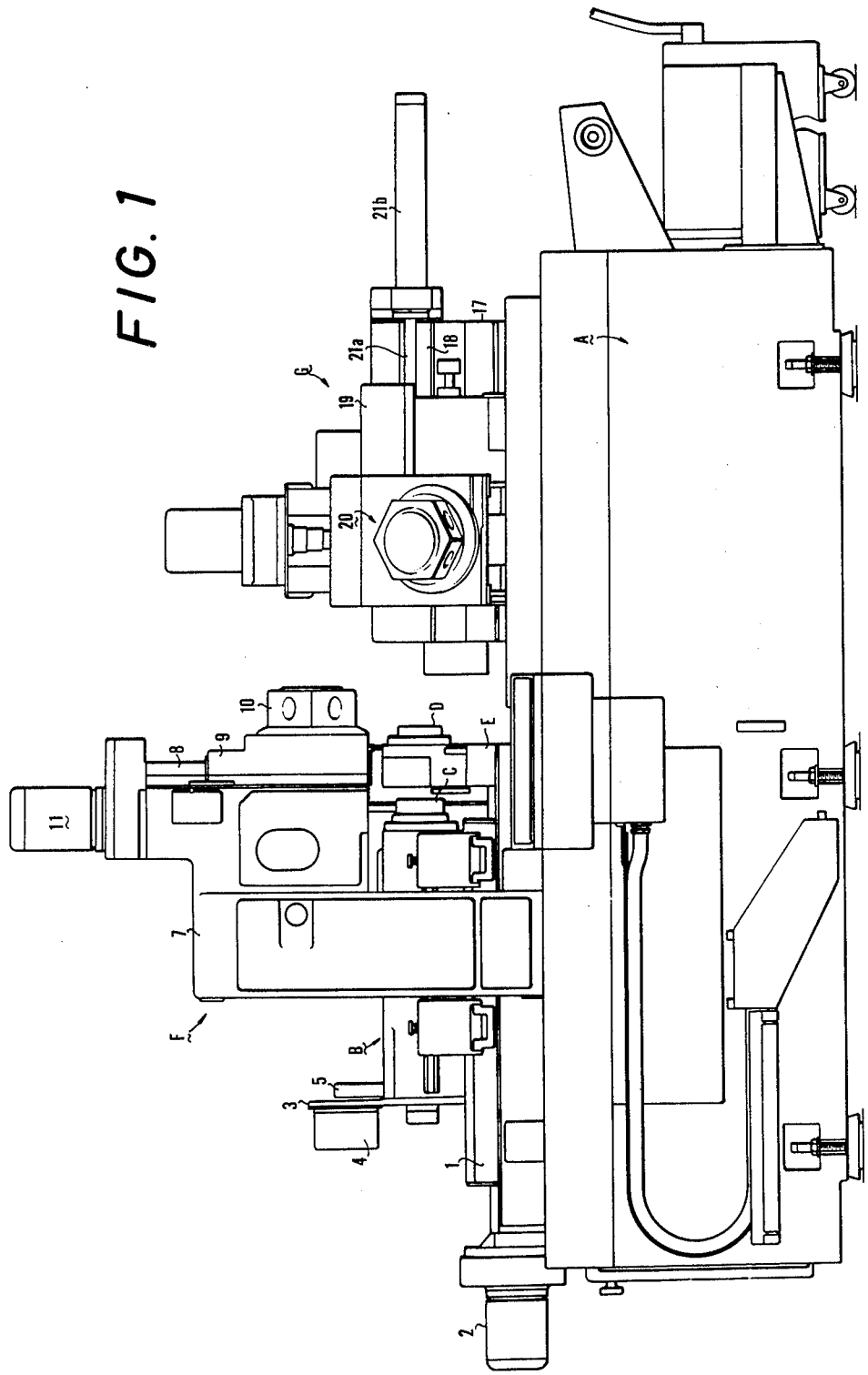
FIG. 1 is a front-elevational view of an automatic control lathe embodying the present invention.
Figure 2:
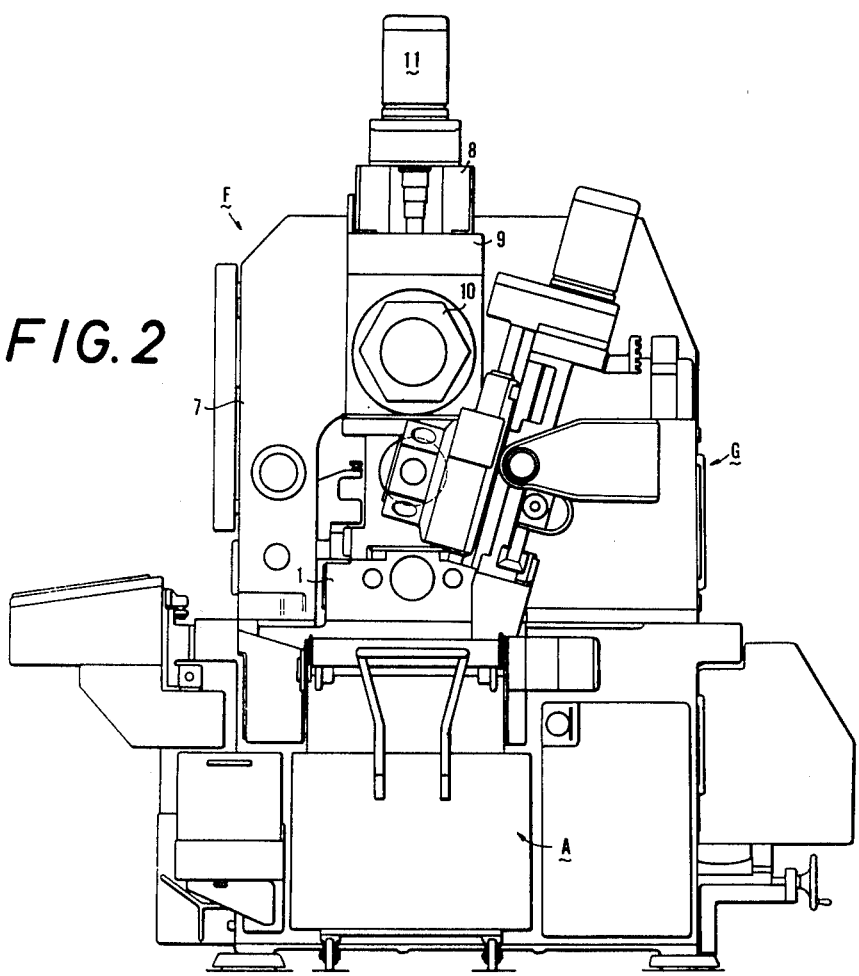
FIG. 2 is a right-hand end view of the lathe of FIG. 1.

FIG. 1 indicates an automatic lathe with a numerical control system embodying the present invention. The automatic lathe comprises a horizontally elongated bed A, a main headstock B reciprocatingly disposed on said bed A so as to travel in a longitudinal direction along said bed, a driving spindle C rotatably supported on said headstock B, a guide bush D disposed coaxially with the axis of the spindle C so as to rotatably support a workpiece W, a pedestal E for supporting said guide bush D and detachably attached to said bed A, a turret tool post F having a slide movable in a direction perpendicular to the axis of the spindle C (i.e. vertically), and another turret tool post G having a slide movable in a direction parallel to the axis of the spindle C (i.e. horizontally).

More specifically, the bed A has a guide rail 1 on which the headstock B is slidably reciprocated by means of a pulse motor 2 (FIG. 1) and feed screw. The headstock B has a bracket 3 attached to the rear end of the body thereof. To the bracket 3 is secured a motor 4 which drives the spindle C via a power transmission device 5 such as a belt-pulley assembly. The headstock B further has a bearing 6 for rotatably supporting the spindle.

The turret tool post F includes a portal housing block 7 spanned over the guide rail 1 and mounted on said bed A, a vertical guide 8 formed on the front side of said housing block 7, a slide block 9 vertically travelling along said guide 8, and a turret 10 rotatably attached to said slide block 9. The turret head 10 is turned at a prescribed angle by the indexing control of the numerical control system for selecting one from the various tools attached to the head 10, and the slide block 9 is adjustably moved by means of a pulse motor 11 mounted on the housing 7.

The workpiece W having a long length and a small diameter is cut at a place close to the front side of the guide bush D by one of the tools attached to said turret head 10 as the slide block 9 is lowered, the workpiece W being supported by the guide bush D, so that the workpiece W is easily shaped with high accuracy even if it is heavily loaded, and chips are conveniently removed from the cutting place without their preventing the cutting operation.

Provided that the workpiece W has such a diameter that the workpiece W can not be passed through the pedestal aperture for setting the guide bush D therein, the guide bush D and pedestal E are removed from the bed A, and the workpiece is supported on the spindle head only by means of a collet chuck. In this case, the workpiece can be heavily cut in high accuracy, because the spindle C is rotatably supported at a place close to the spindle head by bearings 6 (FIG. 3) so as to maintain an adequate rigidity.

Figure 3:
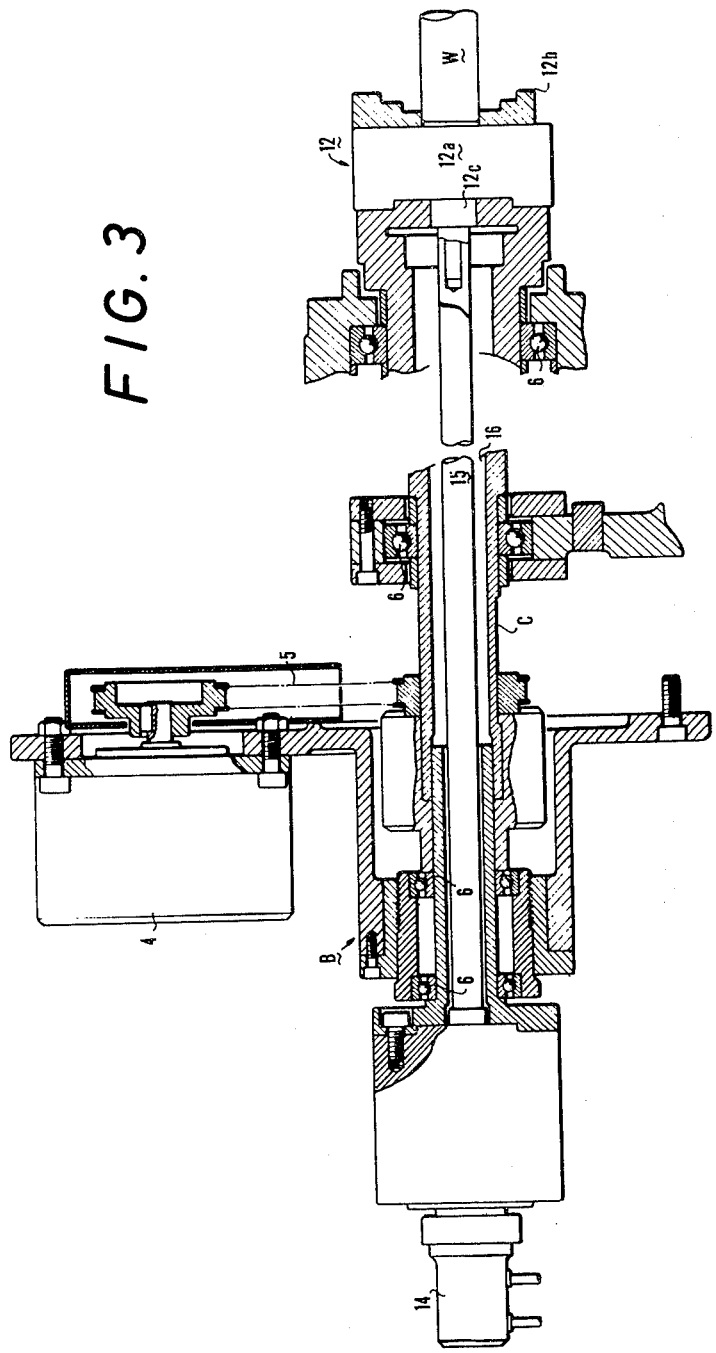
FIG. 3 is a vertical cross-section of a headstock involved in the elements of the lathe.
Figure 4:
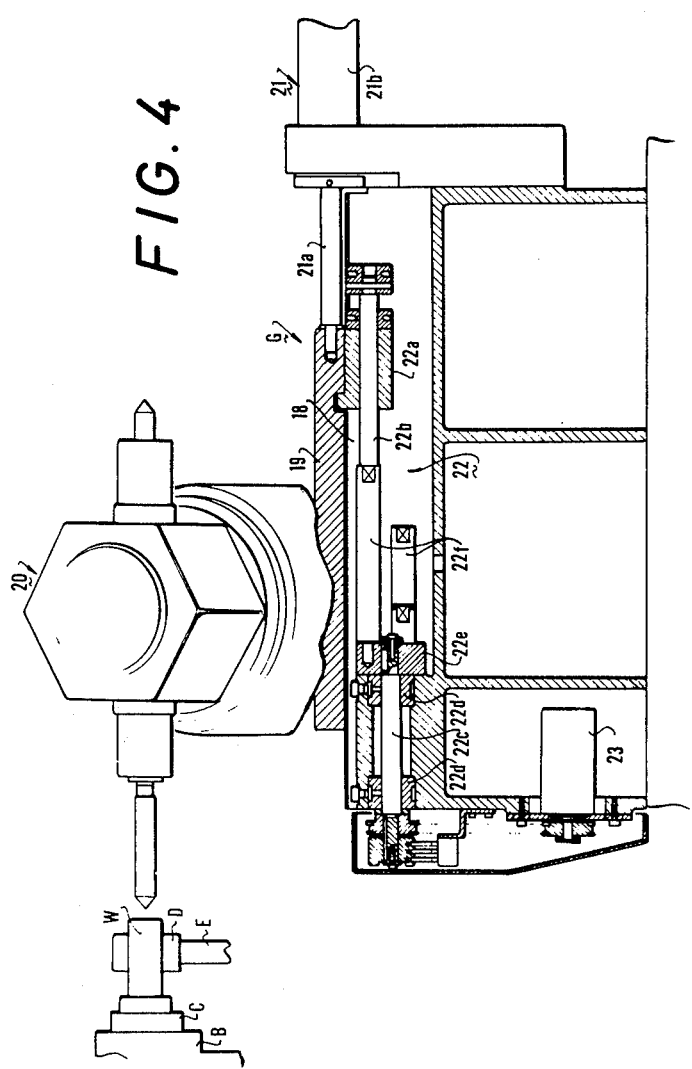
FIG. 4 is a vertical cross-section of the turret toolpost of the lathe.

In order to cut a block-shaped workpiece having a large diameter, the headstock B is, as shown in FIG. 3, provided with a large-diameter chuck 12 which replaces the collet chuck for supporting the small-diameter workpiece together with the guide bush D, and a device for operating said chuck 12. The heavy chuck 12 has a body 12a detachably attached to the front end portion of the spindle by a suitable means, and a couple of clamping pieces 12b operated by a driving shaft 12c. The chuck operating device includes a reciprocating actuator 13 having a housing 13a steadily disposed on the headstock B, a head cylinder 14 rotatably supported on said housing 13a and on the headstock B by means of bearings 6' and attached to the rear end of the spindle, and a connecting rod 15 horizontally extending from the cylinder 14 through a cylindrical hollow 16 formed in the spindle C. The actuator 13 is operated by means of an oil pressure control system (not shown) so as to cause the connecting rod 15 to be horizontally moved.

The front end of the connecting shaft 15 is disengageably connected with the driving shaft 12 by means of screw threads. Accordingly, the workpiece W can be clamped by the clamping pieces 12b with the resultant operation of the actuator 13.

The turret tool post G includes a housing block 17 disposed on the bed A, a guide rail 18 located on the housing block 17 parallel to the axis of the spindle C, a slide block 19 movable along the guide rail 18, a turret head 20 supported on the slide block 19 turnably about an axis inclined on a plane defined normal to the axis of the spindle, an oil pressure actuator 21, i.e., a piston-cylinder assembly having a piston 21a attached to the slide block 19 and a cylinder 21b secured to the front end of the housing block 17, and a device 22 for advancing tools attached to the turret head 20.

The adjusting device 22 comprises a thread piece 22a attached to the bottom of the slide 19, an adjustable screw 22b threaded to the piece 22a, an indexing shaft 22c journaled to bearings 22d attached to the housing 17, an indexing disc 22e fixed to the front end of the shaft 22c, and plurality of stop rods 22f mounted on the disc and selectively facing the end of the screw 22b. The indexing shaft 22c is driven by a motor 23 through a power transmission device such as a belt-pulley assembly.

By the indexing control of a numerical control system (not shown), the motor 23 is driven to turn the indexing shaft 22c, and then one of the stop rods 22f is selected by the rotation of the indexing shaft 22c so that the advance of the selected tool mounted on the turret head 20 is defined. Consequently, the respective ends of the tools can be exactly guided to a cutting position defined near a guide bush D for rotatably supporting the workpiece, in spite of the fact that the tools have different lengths. The advance can be delicately adjusted by the thread control of the screw 22b.

The turret head 20 is turned by means of an oil pressure control device operated in response to the indexing signal supplied from the numerical control system.

In order to obtain a radius approach of the tool to the workpiece, the turret head 20 may be vertically adjusted by a suitable means, for instance, a pulse motor controlled by the numerical control system.

Figure 5:
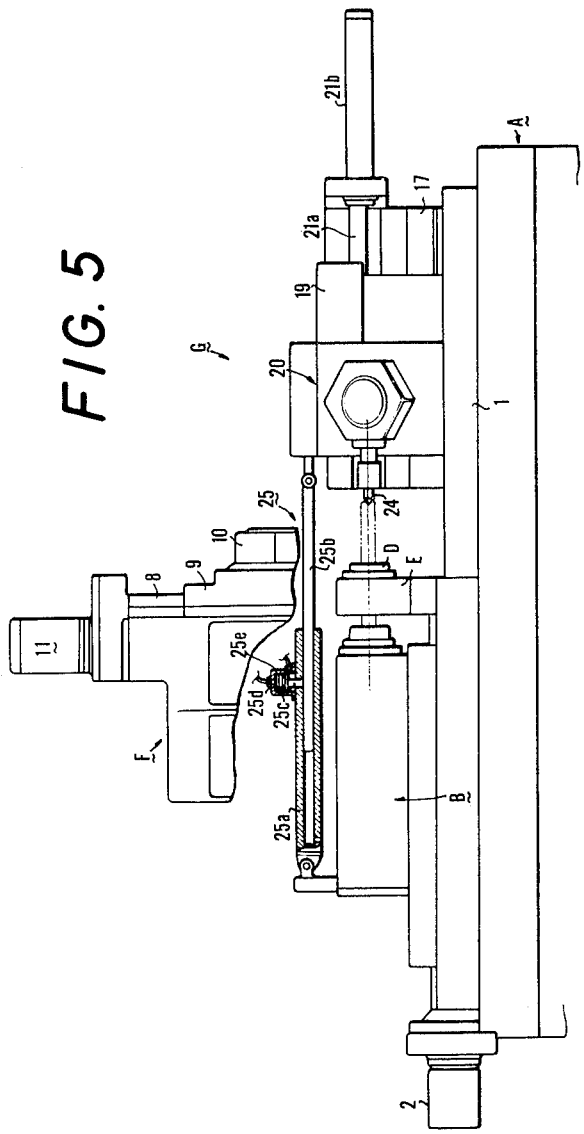
FIG. 5 is a front side view of another embodiment of an automatic control lathe, wherein a control device for synchronously displacing the headstock and turret head is illustrated.

The turret head 20 can be utilized as a tail stock as shown in FIG. 5. In this embodiment, to the tool-attaching place of the turret head 20 is fixed a center member 24 which is aligned coaxially with the axis of the spindle C by the vertical adjustment of the turret head 20 and the positioning control of the numerical control system. Consequently, the workpiece is rotatably supported at its both ends.

Figure 6:
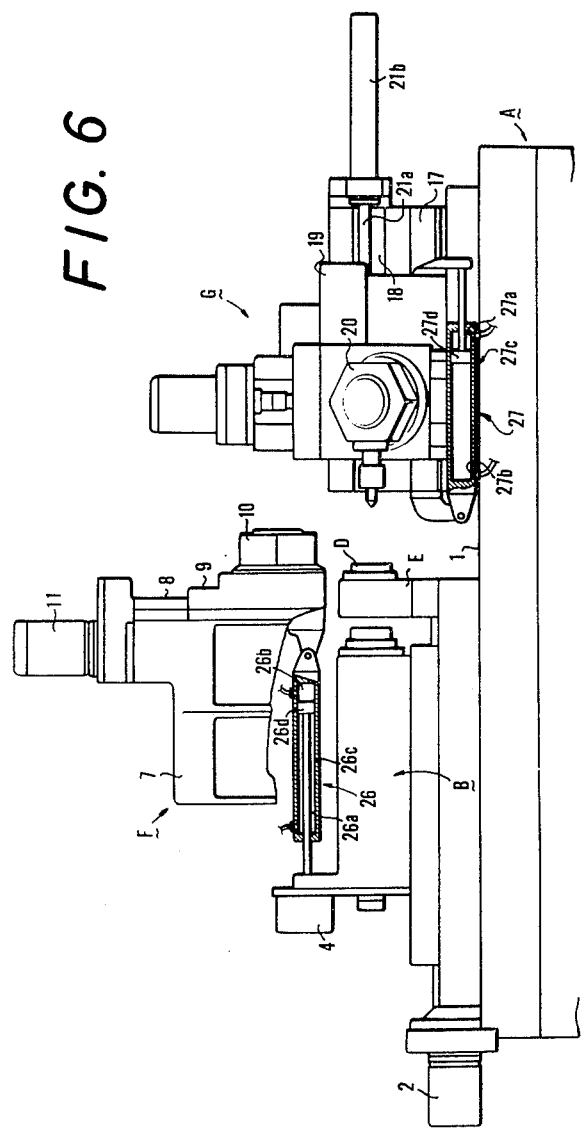
FIG. 6 is a front elevational view partly broken away of another embodiment modified from that of FIG. 5.
Figure 7:
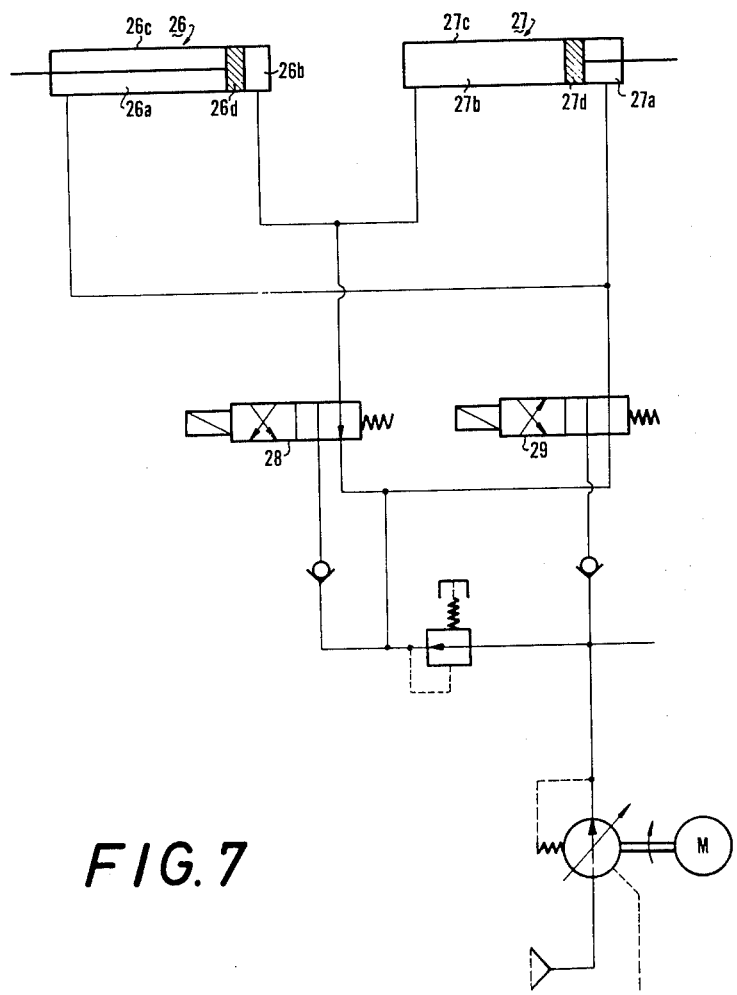
FIG. 7 is an oil control circuit for the control device of FIG. 6.
Figure 8:
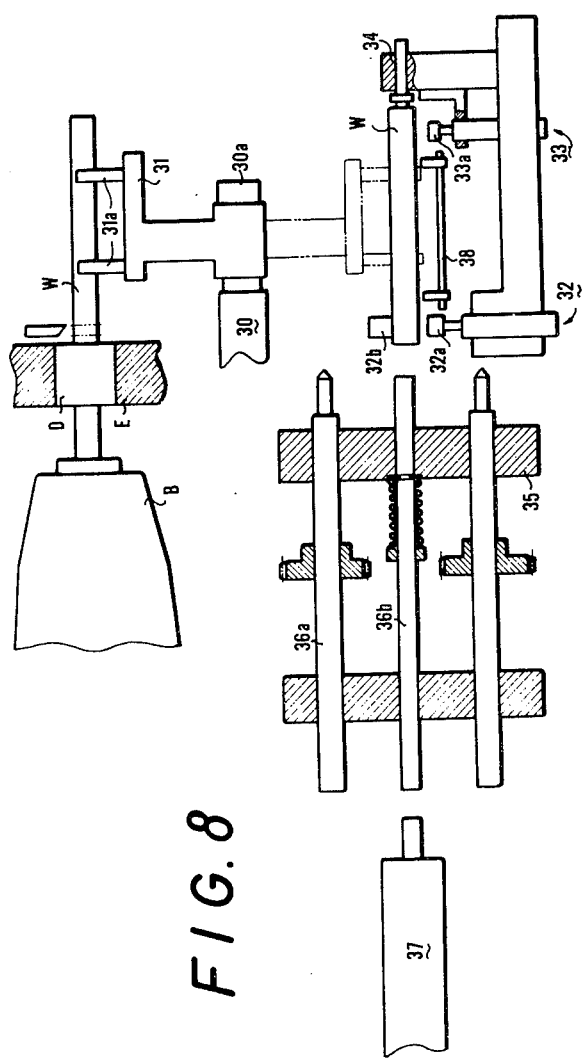
FIG. 8 is a front side view of an attachement device appended to the lathe.
Figure 9:
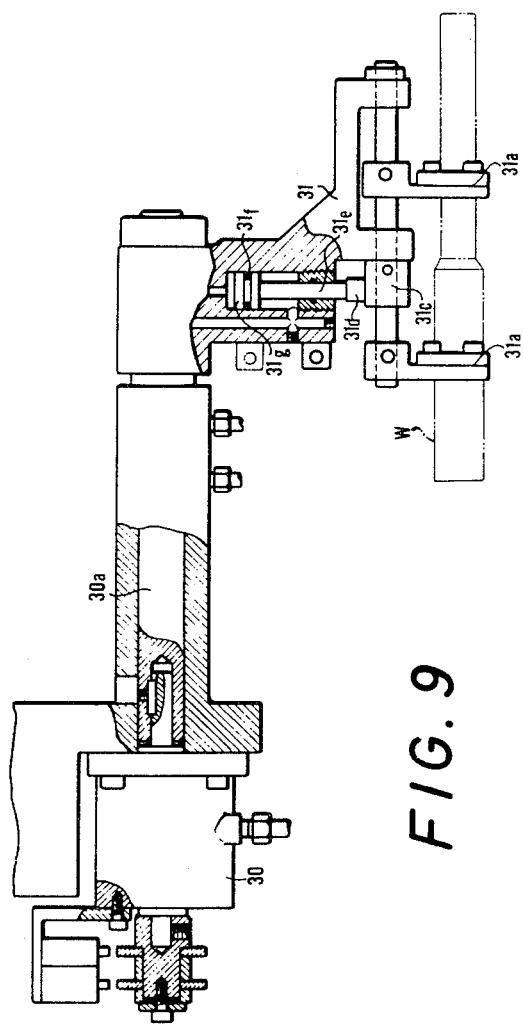
FIG. 9 is a cross-sectional view of the essential part of the attachment device.
Figure 10:
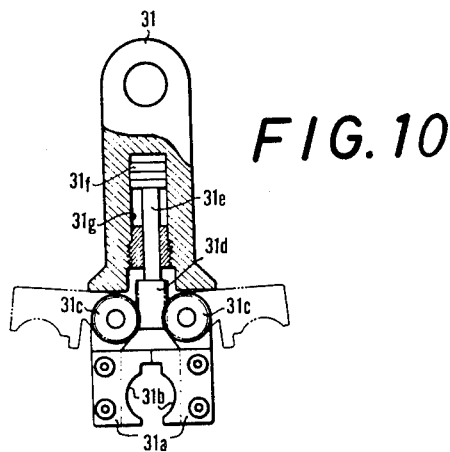
FIGS. 10 and 11 are end views of the clamping device used in the attachment device.
Figure 11:
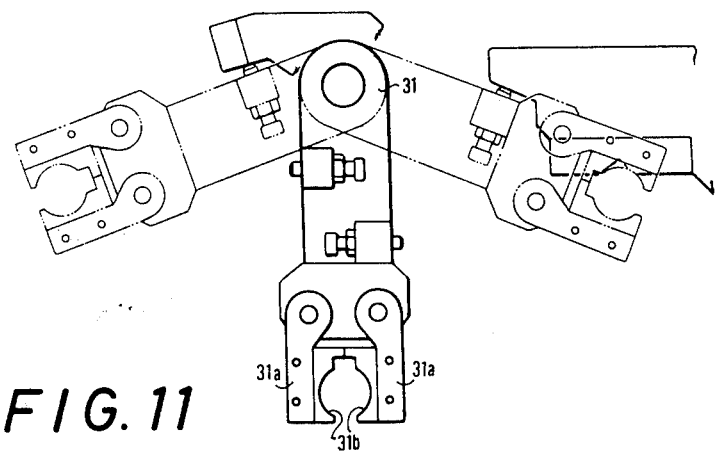

In order to obtain the synchronous travel of the headstock B and slide block 19 with the workpiece W having no load, there may be provided a synchronous control device as shown in FIGS. 5, 6 and 7.

The synchronous control device of FIG. 5 consists of a piston-cylinder assembly 25 having a hollow cylinder 25a, the end of the cylinder being connected with the bracket 3, and a piston 25b slidably inserted into the cylinder 25a and pivotally connected with the slide block 19, a lock pin 25c with a piston 25d slidably inserted into a chamber 25e disposed on the upper side of the cylinder 25a and means for alternately supplying the pressure oil to the chamber 25e divided into two compartments by the piston 25d, so that the pressure oil is supplied to the lower compartment until the center member 24 abuts the free end of the workpiece W so as to support the workpiece W between the tops of the spindle C and center 24, and the supply of the pressure oil to the upper compartment causes the synchronous movement of the headstock B and slide block 19.

Another embodiment of the synchronous control device is illustrated in FIGS. 6 and 7. The device comprises two piston-cylinder assemblies 26 and 27, the former being installed to the headstock B in a manner to bridge the bracket 3 and housing 7, and the latter to tool post F to bridge the slide block 19 and housing block 17.

The piston-cylinder assemblies 26 and 27 have solenoid valves 28 and 29, through which the pressure oil is alternately supplied to chambers 26a and 27a, and 26b and 27b respectively formed in cylinders 26c and 27c by pistons 26d and 27d comparting the cylinders.

When the control of the solenoid valves 28 and 29 relieves the cylinders, the pistons 26d and 27d of the assemblies are synchronously moved, on account of the communication of the chambers 26a and 27a as well as 26b and 27b, so that the synchronous travel of the headstock B and slide block 19 is exactly maintained. Accordingly, the workpiece W can be cut under conditions in which it is relieved from the compression load, by means of a tool attached to the vertical travelling tool head 10.

The automatic control lathe of this invention may be provided with an attachment device including means for taking out a bar-shaped workpiece in a direction perpendicular to the length of the workpiece in order to induce the workpiece into secondary treatment, and means for clamping the workpiece at a determined position, as well as a secondary cutting device, as shown in FIGS. 8 to 11.

The attachment device comprises a rotary actuator 30 having a shaft 30a extending parallel to the shaft 30a and having two pairs of clamping head 31 attached to the shaft 30a and having two pairs of clamping members 31a with rounded grooves 31b for receiving the workpiece W. Each clamping member 31a has a gear 31c intermeshed with a screw gear 31d attached to a piston rod 31e. The piston rod 31e is involved in a piston-cylinder assembly controlled with the oil pressure and which involves a piston 31f connected with the rod 31e and slidably inserted into a hollow cylinder 31g.

In operation, the clamping members 31a, though they are released from the workpiece W while the workpiece W is cut in the first treatment of the main mechine, clamp the workpiece W by the operation of the piston-cylinder assembly as soon as the cutting operation is finished. The actuator 30 is energized so as to turn the shaft 30a and then carry the workpiece to a next treatment position.

In the treating position is provided the above-mentioned secondary cutting device, which comprises supporting devices 32 and 33, a positioner 34 for adjusting the lengthwise position of the workpiece W, and indexing table 35, tool-supporting shafts 36a, 36b — rotatably supported and axially slidable to the indexing table 35, an actuator 37 for urging one of the shafts 36a, 36b — toward the free end of the workpiece W, and means 38 for removing the finished workpiece from the secondary treatment position.

The workpiece W carried to the secondary treating position is supported by the V-shaped blocks 32a and 33a of the supporting device 32 and 33 and adjusted by pushing of the positioner 34 in a lengthwise direction. The supporting device 32 has a stationary V-shaped block 32b which clamps the workpice W by co-operating with the block 32a.

After the workpiece is rigidly supported to the blocks, the free end of the workpiece is cut by one selected from various tools according to the tool-shafts with the resultant rotation of the table 35 defined by the indexing control of an electric control device. Finally, the workpiece is taken out from the secondary treatment position by the removing means 38.

What is claimed is:

1. A numerical control lathe of the sliding-headstock type comprising:
   an elongated bed;
   a headstock reciprocatingly disposed on said bed for travel in a longitudinal direction thereof, said headstock being advanced by numeric control;
   a driving spindle rotatably supported on said headstock, said driving spindle having a collet chuck for clamping a workpiece and a throughgoing bore through which said workpiece is fed;
   a spindle head on said driving spindle;
   means rotatably supporting said driving spindle on said headstock close to said spindle head;
   a guide bush situated coaxially with the axis of said driving spindle so as to rotatably support the workpiece;
   a pedestal for supporting said guide bush and detachably mounted on said bed;
   a first turret toolpost having a slide block driven in numeric control, said slide block being movable in a direction perpendicular to the axis of said driving spindle;
   another turret toolpost having a slide block driven by an oil pressure cylinder, this slide block being movable in a direction parallel to the axis of said driving spindle;
   a turret head mounted on said first turret toolpost, the slide block of the latter being movable in a direction perpendicular to the axis of said driving spindle, said turret head being rotatably supported on said slide block alongside said guide bush with the rotation axis of said turret head being parallel to the axis of said driving spindle;
   a portal housing block spanned over said driving spindle and mounted on said bed;
   a guide rail located on said housing block in a direction perpendicular to the axis of said driving spindle, said slide block of said first turret toolpost being movable along said guide rail;
   an oil pressure actuator for pushing said slide block toward said driving spindle; and
   a device for adjusting progressive advance of tools attached to said turret head for exactly guiding the respective ends of the tools to a cutting position defined near said guide bush even where the tools have different lengths.

2. A numerical control lathe of the sliding-headstock type as defined in claim 1 in which said adjusting device comprises:
   a thread piece attached to the bottom of said slide block;
   an adjustable screw threaded to said piece;
   an indexing shaft journaled to bearings attached to said housing block;
   an indexing disc fixed to the front end of said shaft; and
   a plurality of stop rods mounted on said disc and having different lengths less than the number of tool-attaching portions of said turret head, said stop rods selectively facing the end of said screw, said indexing shaft and disc being set at a selected angle by an indexing control of a numeric control system.

3. A numerical control lathe of the sliding-headstock type as defined in claim 1 in which there is further provided a synchronous control device for obtaining the synchronous travel of the headstock and horizontal slide block with the workpiece being relieved from load.

4. A numerical control lathe of the sliding-headstock type as defined in claim 3 in which the synchronous control device comprises a piston-cylinder assembly having a hollow cylinder, the end of the cylinder being connected with the headstock, and a piston slidably inserted into the cylinder and pivotally connected with the slide block, a lock pin with a piston slidably inserted into a chamber disposed on the side of the cylinder and means for alternately supplying the pressure oil to the chamber so that the supply of the pressure oil for urging the lock pin toward the piston causes the lock of the piston and cylinder and results in the synchronous movement of the head stock and slide block.

5. A numerical control lathe of the sliding-headstock type as defined in claim 3 in which the synchronous control device comprises two piston-cylinder assemblies having mutually communicating paths, the former being adapted for travelling of the headstock, and the latter for travelling of the slide block, so that the pistons of the assemblies are synchronously moved by flowings of the respective paths as the releasing of the oil contained in the cylinders of the assemblies is cut from the oil supply, whereby the synchronous travel of the headstock and slide block is exactly maintained.

* * * * *